United States Patent [19]

Kawahigashi et al.

[11] Patent Number: 4,707,314

[45] Date of Patent: Nov. 17, 1987

[54] PROCESS FOR PRODUCING POLYTETRAFLUOROETHYLENE POROUS FILMS

[75] Inventors: Nobuo Kawahigashi; Shigesou Hashida; Yasunobu Kojima, all of Kanagawa, Japan

[73] Assignee: Nippon Valqua Kogyo Kabushiki Kaisha, Tokyo, Japan

[21] Appl. No.: 752,081

[22] Filed: Jul. 3, 1985

[30] Foreign Application Priority Data

Jul. 4, 1984 [JP] Japan ................. 59-138708

[51] Int. Cl.⁴ .................. B29C 67/20; B29C 55/12
[52] U.S. Cl. .................. 264/127; 264/154; 264/159; 264/237; 264/288.8; 264/290.2; 264/348
[58] Field of Search ........... 264/41, 127, 154, 159, 264/237, 288.8, 290.2, 348

[56] References Cited

U.S. PATENT DOCUMENTS 4,478,898 10/1984 Kato .................. 264/41 X

FOREIGN PATENT DOCUMENTS 53-42794 4/1978 Japan .

Primary Examiner—Philip Anderson
Attorney, Agent, or Firm—Wenderoth, Lind & Ponack

[57] ABSTRACT

A process for producing a polytetrafluoroethylene porous film having excellent mechanical strength wherein pores have a substantially perfect circle and it is possible to uniformly control its pore size to a predetermined size. The porous film is obtained by compression molding polytetrafluoroethylene resin molding powders obtained by a suspension polymerization method to prepare a preform, sintering said preform at a temperature of at least 327° C., forming it into a film, resintering the film at a temperature of at least 327° C., quenching it at a cooling rate of at least 70° C. per hour to reduce the crystallinity of polytetrafluoroethylene to 55% or below, and thereafter stretching said film at a stretch ratio of from 1.3 to 6.5 while heating it to a temperature of from 100° to 320° C.

5 Claims, 6 Drawing Figures mold powder
metal mold press direction resulting preform sintering the preform in producing the PTFE porous films, it is preferable to use, as starting materials, PTFE molding powders obtained by suspension polymerization rather than PTFE fine particles designated as the above fine powders obtained by emulsion polymerization; and (b) the pore characteristics and mechanical strength of the resulting PTFE porous films are greatly improved by preheating a film-shaped PTFE to a temperature of at least 327° C. and thereafter quenching it at a cooling rate of at least 70° C. per hour to reduce the crystallinity thereof to 55% or below prior to stretching the film-shaped PTFE under heating conditions.

PROCESS FOR PRODUCING POLYTETRAFLUOROETHYLENE POROUS FILMS

BACKGROUND OF THE INVENTION

This invention relates to a process for producing a polytetrafluoroethylene porous film, and more particularly to a process for producing a porous film having excellent strength, and substantially circular and relatively uniform pores wherein the porous film is obtained using, as starting materials, polytetrafluoroethylene molding powders obtained by a suspension polymerization method.

Polytetrafluoroethylena resins (hereinafter sometimes referred to as PTFE) have excellent chemical resistance, heat resistance and mechanical characteristics, and therefore have been used in a variety of fields. For example, porous films comprising PTFE have been widely used as a filter for corrosive materials or for high temperature materials because of the characteristics as described above. Further, the porous films comprising PTFE have been also used as electrolysis diaphragms, fuel cells and the like.

Heretofore, porous films have been produced from PTFE resins by a process wherein a liquid lubricant is incorporated into PTFE fine particles designated as fine powders of average particle size of 0.1–0.4 micrometer obtained by emulsion polymerization of tetrafluoroethylene; the blend is compression molded to prepare a preform; it is then formed into a film by processes including extrusion, rolling or combination; the liquid lubricant is then removed; and thereafter the resulting PTFE film is uniaxially or biaxially stretched under conventional heating conditions. For example, Japanese Patent Publication No. 42794/1978 discloses a process for producing a PTFE porous article which comprises the steps of heating a sintered PTFE film to a temperature of at least 327° C., thereafter slowly cooling it, heat-treating such that its crystallinity is at least 80%, and thereafter uniaxially stretching it at a stretch ratio of from 1.5 to 4 at a temperature of from 25° to 260° C.

However, it is difficult to produce substantially perfect circular pores having a predetermined size in the PTFE porous films produced by such processes. Further, the mechanical strength of the porous film is not entirely sufficient.

We have carried out studies in order to overcome the problems described above and found the following facts to achieve the present invention. That is to say, (a) in producing the PTFE porous films, it is preferable to use, as starting materials, PTFE molding powders obtained by suspension polymerization rather than PTFE fine particles designated as the above fine powders obtained by emulsion polymerization; and (b) the pore characteristics and mechanical strength of the resulting PTFE porous films are greatly improved by preheating a film-shaped PTFE to a temperature of at least 327° C. and thereafter quenching it at a cooling rate of at least 70° C. per hour to reduce the crystallinity thereof to 55% or below prior to stretching the film-shaped PTFE under heating conditions.

SUMMARY OF THE INVENTION

Figure 1A:
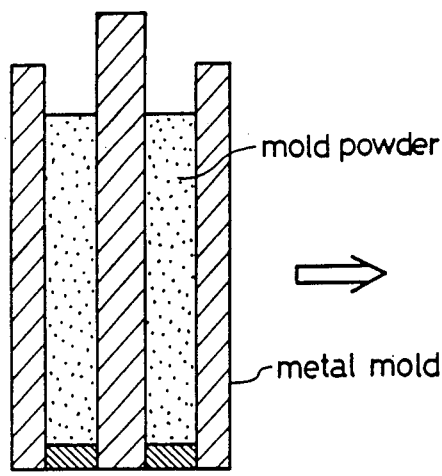
FIGS. 1(a)–1(f) of the drawings illustrate the sequential process steps of the present invention.
Figure 1B:
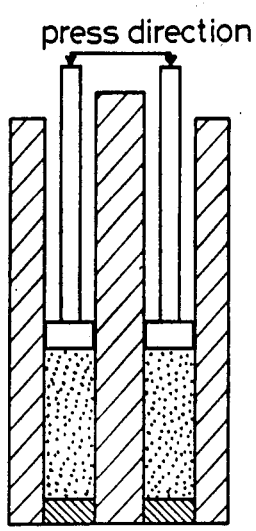
Figure 1C:
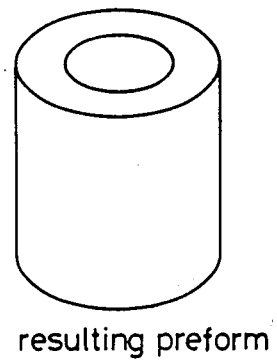
Figure 1D:
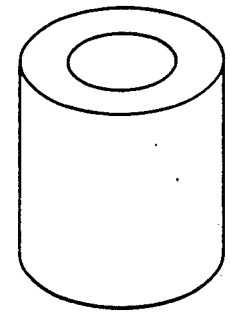
Figure 1E:
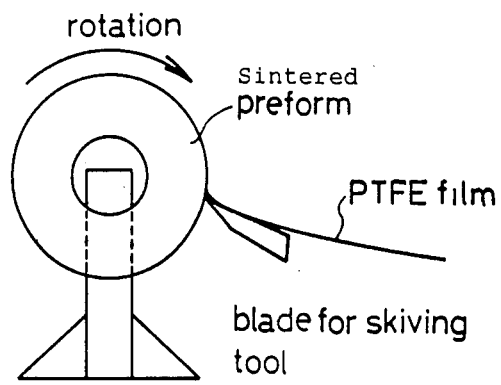
Figure 1F:
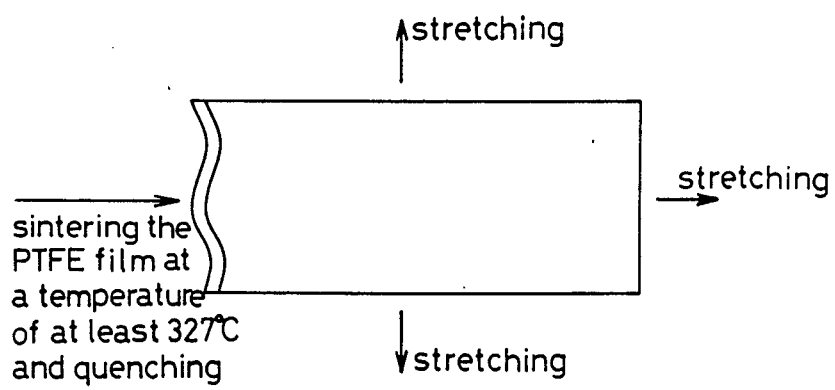

It is an object of the present invention to overcome the problems described above.

It is another object of the present invention to provide a process for producing a PTFE porous film wherein the pores have a substantially perfect circle and it is possible to uniformly control its pore size to a predetermined size.

It is a further object of the present invention to provide a process for producing a PTFE porous film having excellent mechanical strength.

A process for producing a PTFE porous film according to the present invention comprises the steps of compression molding PTFE molding powders of average particle diameter of from 1 to 900 micrometers obtained by a suspension polymerization method to prepare a PTFE preform, sintering the preform at a temperature of at least 327° C., forming it into a film, then sintering the resulting film at a temperature of at least 327° C., thereafter quenching it at a cooling rate of at least 70° C. per hour to reduce the crystallinity of PTFE to 55% or below, and then uniaxially or biaxially stretching the film at a stretch ratio of from 1.3 to 6.5 while heating it to a temperature of from 100° to 320° C.

DETAILED DESCRIPTION OF THE INVENTION

The drawings schematically demonstrate Applicants' process steps of producing a polytetrafluoroethylene (PTFE) porous film in which PTFE power is sequentially molded, pressed to produce a preform, sintered, formed into a film, and wherein the film is sintered and stretched.

PTFE materials used in producing a PTFE porous films according to the present invention are PTFE molding powders of average particle diameter of from 1 to 900 micrometers, preferably from 10 to 50 micrometers obtained by a suspension polymerization method.

When such PTFE molding powders are preformed in a metal mold or the like under a molding pressure of from 100 to 300 kg/cm$^2$, a PTFE preform is obtained. This preform is then sintered at a temperature of at least 327° C., preferably from 350° to 380° C., and thereafter cooled to obtain a usually cylindrical molded product. This cylindrical molded product is cut by means of a film cutter or the like to obtain a PTFE film having a thickness of about 0.05 to about 0.2 mm. This PTFE film is used as a preferred film in the present invention.

While the PTFE film is obtained by sintering the PTFE preform and thereafter cutting it, PTFE films obtained by methods other than cutting can also be used in the present invention. In brief, the PTFE films used in the present invention may be any films provided that they are those films obtained by compression molding PTFE molding powders of average particle diameter of from 1 to 900 micrometers obtained by a suspension polymerization method and thereafter sintering them.

The PTFE film thus obtained is again sintered at a temperature of at least 327° C., preferably from 350° to 390° C., and then quenched at a cooling rate of at least 70° C. per hour to reduce the crystallinity of PTFE to 55% or below. The quenching treatment makes it possible to control the pore size of the subsequently obtained PTFE porous film to a predetermined size; to obtain pores having a substantially perfect circle; and to obtain a porous film having excellent mechanical strength.

If the cooling rate is less than 70° C. per hour in cooling the molten PTFE, the crystallinity of PTFE varies to a less extent. If the cooling rate is at least 70° C. per hour, the crystallinity of PTFE rapidly reduces. This has been known in the art. In the present invention, it is necessary that PTFE is sintered at a temperature of at least 327° C. to form molten PTFE and the molten PTFE is cooled at a cooling rate of at least 70° C. per hour in order to reduce the crystallinity of PTFE to 55% or below.

One or more quenching treatments of the PTFE film are carried out. The quenching treatments of the PTFE film may be carried out twice or more.

The thus quenched PTFE film is then uniaxially or biaxially stretched at a stretch ratio of from 1.3 to 6.5 while heating it to a temperature of from 100° to 320° C., preferably from 200° to 250° C. If the temperature of PTFE is below 100° C. in stretching, the breaking of the resulting PTFE porous film and other drawbacks are observed, and the mechanical strength of the porous film is insufficient. Therefore, the use of lower temperatures is undesirable. On the other hand, if the temperature of PTFE is above 320° C., pores having a uniform pore size are not formed in the PTFE film, and therefore the use of upper temperatures is undesirable.

The preferred stretch ratio of the PTFE film is from 1.3 to 6.5. If the stretch ratio is more than 6.5, pin holes are generated in the film and the film tends to break during stretching. Therefore, the use of upper stretch ratio is undesirable. On the other hand, if the stretch ratio is less than 1.3, the desired fine pores cannot be obtained and therefore the use of lower stretch ratio is undesirable.

Such a stretching is carried out in a uniaxial or biaxial direction, preferably in a biaxial direction. When the PTFE film is subjected to biaxial stretching, such an effect that the pores of the resulting PTFE porous film have a substantially perfect circle is observed.

The PTFE porous film obtained by the present invention has a number of continuous pores This is confirmed from the fact that the porous film exhibits a large gas permeability. The gas permeability Q of a PTFE porous film obtained by the present invention may largely vary depending upon the stretch ratio, film thickness and gas pressure difference ΔP of the PTFE film. For example, when the gas pressure difference ΔP is 0.5 kg/cm$^2$, the gas permeability Q is from about 50 to about 300 milliliters/minute/square centimeter.

Further, the shape of the pores formed in the PTFE porous film obtained by the present invention can be examined by electron microscope photography. The pores have a substantially perfect circle. The pore size may largely vary depending upon the stretch ratio. When the PTFE film was biaxially stretched at a stretch ratio of 2×2, the pore size was from about 0.2 to about 0.5 micrometer. Further, the pore density was about 1.0×10$^8$/cm$^2$ to about 3.0×10$^8$/cm$^2$.

In the process for producing the PTFE porous film according to the present invention, the PTFE molding powders of average particle size of 1–900 micrometers obtained by a suspension polymerization method are used as the starting materials; and resintering and quenching treatments are used prior to stretching of the PTFE film to reduce the crystallinity of PTFE to 55% or below. Accordingly, the resulting PTFE porous film has the following effects and advantages.

(a) The porous film has substantially perfect circular pores, and its pore size is uniform.

(b) The mechanical strength is excellent.

The following non-limiting examples illustrate the present invention.

EXAMPLE 1

PTFE molding powders of average particle diameter of 25 micrometers obtained by a suspension polymerization method (Polyfuron M 12 available from Daikin, K.K., Japan) was preformed in a metal mold under a molding pressure of 150 kg/cm$^2$, and the preform was sintered at a temperature of 365° C. to prepare a PTFE molded product. The PTFE molded product was cut to prepare a PTFE film having a film thickness of 0.1 mm.

The resulting PTFE film was sintered for one hour in a 370° C. furnace, and removed from the furnace. The PTFE film was allowed to stand in air to be subjected to quenching treatment. The crystallinity and specific gravity of the quenched PTFE film were 52.5% and 2.14, respectively.

The quenched PTFE film was biaxially stretched at a stretch ratio of 1.5×1.5 at a temperature of 200° C. to obtain a PTFE porous film. This porous film had a number of substantially perfect circular pores having a pore size of from 0.2 to 0.25 micrometer. The pore density was about 2×10$^8$/cm$^2$.

Further, the N$_2$ gas permeability Q of the resulting PTFE porous film was measured by varying the gas pressure difference ΔP. The results obtained are shown in Table 1.

EXAMPLE 2

A PTFE porous film was produced in the same manner as described in Example 1 except that a PTFE film was biaxially stretched at a stretch ratio of 2×2.

The resulting PTFE porous film had a number of substantially perfect circular pores having a pore size of no more than 0.5 micrometers. Further, the N$_2$ gas permeability of the film was measured in the same manner as described in Example 1. The results obtained are shown in Table 1.

EXAMPLE 3

A PTFE porous film was produced in the same manner as described in Example 1 except that the temperature of a PTFE film during stretching was 315° C.

The N$_2$ gas permeability Q of the resulting PTFE porous film was measured in the same manner as described in Example 1. The results obtained are shown in Table 1.

TABLE 1

| Pressure Difference [kg/cm$^2$] ΔP | Permeability Q (ml/min/cm$^2$) |
|---|---|
| Example 1 | |
| 0.5 | 69 |
| 0.8 | 125 |
| 1.1 | 185 |
| 1.4 | 240 |
| 1.7 | 300 |
| 2.0 | 360 |
| Example 2 | |
| 0.5 | 300 |
| 0.8 | 530 |
| 1.1 | 790 |
| 1.4 | 1050 |
| 1.7 | 1350 |
| 2.0 | 1650 |
| Example 3 | |
| 0.5 | 59 |
| 0.8 | 90 |

TABLE 1-continued

| Pressure Difference [kg/cm$^2$] $\Delta P$ | Permeability Q (ml/min/cm$^2$) |
| --- | --- |
| 1.1 | 127 |
| 1.4 | 174 |
| 1.7 | 215 |
| 2.0 | 270 |

COMPARATIVE EXAMPLE 1

A PTFE porous film was produced in the same manner as described in Example 1 except that resintering and quenching treatments were not carried out.

When the resulting PTFE porous film was examined by means of electron microscope photograph, the pores were uneven. Further, the film strength was weak. When the PTFE porous film was processed, pin holes were generated in the processed product.

COMPARATIVE EXAMPLE 2

Try was made to produce a PTFE porous film in the same manner as described in Example 1 except that the temperature of a PTFE film during stretching was 340° C. However, no pores were generated in the PTFE film, and no PTFE porous film was obtained.

What is claimed is:

1. A process for producing a polytetrafluoroethylene porous film which comprises the steps of compression molding polytetrafluoroethylene resin molding powders of average particle diameter of from 1 to 900 micrometers obtained by a suspension polymerization method to prepare a polytetrafluoroethylene preform, sintering said preform at a temperature of at least 327° C., forming it into a film, then sintering the resulting film at a temperature of at least 327° C., thereafter quenching it at a cooling rate of at least 70° C. per hour to reduce the crystallinity of polytetrafluoroethylene to 55% or below, and then uniaxially or biaxially stretching said film at a stretch ratio of from 1.3 to 6.5 while heating it to a temperature of from 100° to 320° C.

2. The process of claim 1 wherein an average particle diameter of the polytetrafluoroethylene resin molding powders is 10–50 micrometers.

3. The process of claim 1 wherein the step of compression molding is carried out in a metal mold under a molding pressure of from 100 to 300 kg/cm$^2$.

4. The process of claim 1 wherein the preform is sintered at a temperature of 350° to 380° C.

5. The process of claim 1 wherein the uniaxially or biaxially stretching step is carried out at a temperature of 200° to 250° C.

* * * * *